United States Patent [19]

Ugo

[11] 4,163,664

[45] Aug. 7, 1979

[54] PROCESS FOR PRECIPITATING PRECIOUS METALS FROM SOLUTIONS WHICH CONTAIN THEM

[75] Inventor: Renato Ugo, Cinisello Balsamo, Italy

[73] Assignee: PROTEC Processi e Tecnologie S.p.A., Milan, Italy

[21] Appl. No.: 866,904

[22] Filed: Jan. 4, 1978

Related U.S. Application Data

[63] Continuation of Ser. No. 780,430, Mar. 22, 1977, abandoned, which is a continuation of Ser. No. 666,430, Mar. 12, 1976, abandoned.

[30] Foreign Application Priority Data

Mar. 27, 1975 [IT] Italy ............................... 21716 A/75

[51] Int. Cl.$^2$ ............................................. C22B 11/04
[52] U.S. Cl. .................................. 75/108; 75/118 R; 75/118 P; 75/121; 75/0.5 A
[58] Field of Search ................. 75/108, 118 R, 118 P, 75/121, 0.5 A

[56] References Cited

U.S. PATENT DOCUMENTS

| | | | |
|---|---|---|---|
| 1,686,391 | 10/1928 | Muller et al | 75/108 |
| 3,457,116 | 7/1969 | Arcano et al. | 75/108 |
| 3,536,479 | 10/1970 | Illis et al. | 75/121 |
| 3,877,931 | 4/1975 | Neskora et al. | 75/108 |
| 3,887,489 | 6/1975 | Fannin et al. | 423/224 |

*Primary Examiner*—G. Ozaki
*Attorney, Agent, or Firm*—Stevens, Davis, Miller & Mosher

[57] ABSTRACT

Process for the practically total precipitation of precious metals from solutions which contain them, according to which said solutions are treated with carbon monoxide in the presence of a quantity of water or a primary or secondary alcohol at least equal in weight to the total quantity of precious metal present.

6 Claims, No Drawings

PROCESS FOR PRECIPITATING PRECIOUS METALS FROM SOLUTIONS WHICH CONTAIN THEM

This is a continuation Ser. No. 780,430, Mar. 22, 1977, abandoned which is a continuation of application Ser. No. 666,430, filed Mar. 12, 1976 now abandoned.

This invention relates to a new process for the practically total precipitation of precious metals (Pt, Pd, Au, Ag, Bu, Rh, Os, Ir) from solutions which contain them.

Various processes have been devised for extracting precious metals from mineral gangues which contain them in mixture in small percentages, and for recovering precious metals from the effluents of various processes, such as the recovery of precious metals deriving from catalysts, or from effluents deriving from the re-manufacture of nuclear fuels.

In these processes the noble metals are recovered in all cases from a solution, and the process may be carried out industrially and economically only if the solutions to be treated contain more than 10 ppm of the metals.

The industrial methods used up to the present time may be grouped as follows:
(a) methods for their precipitation in the form of salts or complexes,
(b) cementation methods using reducing metals,
(c) electrolytic deposition methods,
(d) methods for fixing the metal ions on resins or on solid compounds with chelating and complexing groups.

None of these methods, no matter to which solution of which origin they are applied, ever lead to complete precipitation of the precious metals. The residual solutions generally contain at least 1 to 5 ppm of precious metals which cannot be further recovered except by recycling the solutions. Recycling has two obvious disadvantages: on the one hand it represents a burden on the processing cycles and on the other hand it requires a strong capital investment for the metals temporarily untreated.

A new process has now been found which allows the practically complete precipitation of all precious metals contained in a solution, whether they are in the form of aqueous ions, complex ions, covalent complexes or salts of any acid. The new process may be applied to solutions in any solvent and of any concentration, i.e. relatively concentrated solutions such as those deriving from mineral attack, and very dilute solutions, and in particular may be applied to solutions of concentration less than 10 ppm.

The process consists essentially of treating the solutions with carbon monoxide in the presence of quantities of water or primary or secondary alcohols equal or greater in weight than the total quantity of precious metals present. The process is carried out preferably at a pH from 0 to 7, at a temperature from 20° to 200° C. and under carbon monoxide pressures from 1 to 100 atmospheres. At pH values greater than 7 there is a certain precipitation of the metals in the form of oxides or hydroxides which slow down the reaction with the carbon monoxide. Temperatures greater than atmospheric temperature accelerate separation, but in the case of dilute solutions there is no economical convenience in providing such temperatures unless under special conditions, such as the availability of hot process effluents which can be worthwhile treating directly without passing through an intermediate cooling stage. There is no actual upper limit to the carbon monoxide pressure used, other than that imposed by economic convenience.

As stated, the conditions indicated are substantially the preferred conditions, but are not critical.

It is also preferable to continuously remove the $CO_2$ formed in the process. Reaction times vary, according to the metal or metals present in the solution and their concentration, from one hour to some days.

Precipitation of the metal may be facilitated and accelerated by using normal techniques such as the introduction of germ crystals or materials of the filter aid type.

Because of the high density of the precipitate, it is easy to decant it, filter it and wash it with water.

The metals obtained by the process according to the invention have a purity greater than 99%. The residual solution contains quantities of metal less than 0.1 ppm., i.e. quantities of metal which are absolutely negligible.

Summarizing, the advantages offered by the new process according to the invention compared with known processes are:

practically total recovery of the precious metal from their solutions, without the need for recycling, ability to treat solutions containing quantities of precious metals even less than 10 ppm, ability to treat any type of solution containing precious metals in any form, and extreme simplicity and low cost of the process, Some illustrative examples are given hereinafter to better clarify the basis of the invention, but without in any way limiting it.

EXAMPLE 1

One liter of an aqueous solution of ruthenium trichloride hydrate containing 2 ppm of ruthenium is brought to pH 6 and saturated with carbon monoxide. Precipitation is complete after 20 hours. The ruthenium is separated in the form of a microcrystalline, easily decantable powder, with a purity of 99.9%. The mother liquors when analysed show a ruthenium content less than analytical limits, i.e. less than 0.01 ppm.

The ruthenium recovery can therefore be considered total.

EXAMPLE 2

1% of water is added to one liter of acetone containing palladium nitrate and rhodium nitrate in quantities equivalent to 1 ppm of palladium and 2 ppm of rhodium, and the mixture saturated with CO at ambient temperature and under atmospheric pressure.

The reaction is complete after 25 hours.

A microcrystalline, easily decantable powder separates, containing palladium and rhodium in a ratio by weight of 1:2 and of 99.9%. purity.

The residual acetone solution shows an analysis of palladium concentration of 0.03 ppm and a rhodium concentration of 0.09 ppm, and the recovery of the two metals can therefore be considered total.

EXAMPLE 3

One liter of an aqueous solution containing 3.5 ppm of palladium in the form of palladium nitrate, 11.1 ppm of rhodium in the form of rhodium trichloride and 4.1 ppm of ruthenium in the form of ruthenium trichloride is brought to pH 5 and saturated with CO at ambient temperature and atmospheric pressure. The reaction is complete after 5 hours.

A microcrystalline, easily decantable powder is obtained, which contains the three metals in the same ratio by weight in which they were present in the treated solution.

The analysis of the residual liquid shows a palladium concentration of 0.06 ppm, a rhodium concentration of 0.09 ppm and a quantity of ruthenium less than analytical limits (0.01 ppm).

The precipitation of the three metals is considered total.

EXAMPLE 4

One liter of an aqueous solution made acid with nitric acid (pH 2), containing a total of 2 ppm of palladium, rhodium and ruthenium in the ratio of 20% of palladium, 40% of rhodium and 40% of ruthenium, plus a total of 10 g/l of $MgSO_4$, $Zn(NO_3)_2$ and $Na_2SO_4$, is saturated with CO at ambient temperature and atmospheric pressure.

The reaction is complete after 24 hours.

A microcrystalline, easily decantable solid separates, containing palladium, rhodium and ruthenium in the same ratio as in the initial solution. The analysis of the mother liquors shows a total concentration of precious metals of 0.05 ppm, of which 0.03 ppm are rhodium, 0.02 ppm are palladium and the ruthenium quantity is less than analytica limits (0.01 ppm).

EXAMPLE 5

An industrial effluent consisting of an aqueous solution from which the precious metals have been separated by cementation, contains a total of 3 ppm of palladium, platinum, gold and rhodium, 100 g/l of $ZnSO_4$, 10 g/l of $Na_2SO_4$ and 5 g/l of $Al_2(SO_4)_3$.

This solution, which is initially acidified with $H_2SO_4$ (pH=O), is brought to $pH_3$ with NaOH and then saturated with CO at ambient temperature and under atmospheric pressure.

The reaction is complete after 30 hours.

A microcrystalline solid is separated, containing palladium, platinum, gold and rhodium in approximately the same ratio as in the initial solution. The analysis of the residual liquid shows a total concentration of precious metals of the order of the analytical limit (0.01–0.05 ppm).

All the precious metals are therefore recovered practically totally.

EXAMPLE 6

One liter of a solution of hexachloroplatinic acid in isopropyl alcohol, containing a total of 15 ppm of Pt, is saturated with CO at 40° C. and under atmospheric pressure.

The reaction is complete after 15 hours.

A microcrystalline, easily decantable solid separates consisting of Pt of 99.9% purity.

The analysis of the method liquors shows a residual Pt concentration of 0.13 ppm.

EXAMPLE 7

One liter of a solution of Rh trichloride and Ru trichloride in isopropyl alcohol, containing 7.5 ppm of Rh and 30 ppm of Ru, is saturated with CO at 50° C. under atmospheric pressure.

The reaction is complete after 40 hours.

A microcrystalline, easily decantable solid separates and is filtered. The analysis of the solution indicates a residual content of precious metals equal to 0.70 ppm of Rh and 0.15 ppm of Ru.

The precipitation of these metals is therefore practically total.

I claim:

1. A process for the substantially total precipitation of precious metal selected from the group consisting of platinum, palladium, gold, silver, ruthenium, rhodium, osmium and iridium from a solution containing the ions thereof in a concentration of less than 10 ppm, which comprises treating said solution with carbon monoxide at a pH between 0 and 7, at a temperature between 20° and 200° C. and at a carbon monoxide pressure between 1 and 100 atmospheres in the presence of a quantity of water or a primary or secondary alcohol at least equal in weight to the total quantity of precious metals present, until the amount of metals remaining in solution is less than 1 ppm.

2. A process according to claim 1, wherein treatment is conducted in the presence of water.

3. A process according to claim 1 wherein treatment is conducted in the presence of a secondary alcohol.

4. A process for a substantially total precipitation of platinum, palladium, ruthenium, rhodium, osmium and iridium from a solution containing ions thereof, which comprises treating said solution with carbon monoxide in the presence of a quantity of water or a primary or a secondary alcohol at least equal in weight to the total quantity of metals present in solution at a pH between 0 and 7, at a temperature between 20° C. and 200° C., and at a carbon monoxide pressure between 1 and 100 atmospheres, until the amount of metals remaining in solution is less than 1 ppm.

5. A process according to claim 4 wherein the process is conducted in the presence of water.

6. A process according to claim 4 wherein the process is conducted in the presence of a secondary alcohol.

* * * * *

UNITED STATES PATENT AND TRADEMARK OFFICE
CERTIFICATE OF CORRECTION

PATENT NO. : 4,163,664
DATED : August 7, 1979
INVENTOR(S) : RENATO UGO

It is certified that error appears in the above-identified patent and that said Letters Patent are hereby corrected as shown below:

Column 1, line 10, change "Bu" to -- Ru --;

Column 1, lines 61 and 62, change "atmospheric" to -- room --;

Column 3, line 38, change "pH $_3$ to -- pH 3 --.

Signed and Sealed this

Eleventh Day of March 1980

[SEAL]

Attest:

SIDNEY A. DIAMOND

Attesting Officer — Commissioner of Patents and Trademarks